US005959025A

United States Patent [19]
Lewis et al.

[11] Patent Number: 5,959,025
[45] Date of Patent: Sep. 28, 1999

[54] ADDITIVE FOR THE PREVENTION OF NITROSAMINE FORMATION IN SILICONE ARTICLES

[75] Inventors: Larry Neil Lewis, Scotia; Edward Matthew Jeram, Burnt Hills, both of N.Y.

[73] Assignee: General Electric Company, Pittsfield, Mass.

[21] Appl. No.: 08/670,474

[22] Filed: Jun. 26, 1996

Related U.S. Application Data

[62] Division of application No. 08/350,935, Dec. 7, 1994, Pat. No. 5,543,457.

[51] Int. Cl.[6] .................................................. C08J 97/00
[52] U.S. Cl. ......................... 524/741; 524/736; 524/739; 524/862; 528/15; 528/31
[58] Field of Search ..................... 524/736, 862, 524/738, 739, 102, 741; 428/35.7, 36.9, 36.8, 321.5; 528/15, 31; 106/499; 252/405

[56] References Cited

U.S. PATENT DOCUMENTS

| | | | |
|---|---|---|---|
| 3,197,433 | 7/1965 | Lamoreau | 260/46.5 |
| 3,220,972 | 11/1965 | Lamoreaux | 260/46.5 |
| 3,445,420 | 5/1969 | Kookootsedes et al. | 260/37 |
| 3,635,743 | 1/1972 | Smith | 106/288 Q |
| 3,715,334 | 2/1973 | Karstedt | 260/46.5 UA |
| 3,775,452 | 11/1973 | Karstedt | 260/429 R |
| 3,814,730 | 6/1974 | Karstedt | 260/46.5 UA |
| 3,847,848 | 11/1974 | Beers | 260/185 |
| 3,884,866 | 5/1975 | Jeram et al. | 260/32.85 B |
| 3,917,432 | 11/1975 | Feuerstein et al. | 415/118 |
| 3,989,667 | 11/1976 | Lee et al. | 260/46.5 UA |
| 4,162,243 | 7/1979 | Lee et al. | 260/375 B |
| 4,288,345 | 9/1981 | Ashby et al. | 252/431 R |
| 4,340,709 | 7/1982 | Jeram et al. | 528/15 |
| 4,382,057 | 5/1983 | Tolentino | 264/328.2 |
| 4,427,801 | 1/1984 | Sweet | 523/212 |
| 4,529,774 | 7/1985 | Evans et al. | 524/860 |
| 4,919,983 | 4/1990 | Fremin | 428/35.7 |
| 4,975,270 | 12/1990 | Kehoe | 424/48 |
| 5,025,048 | 6/1991 | Burnier | 524/99 |
| 5,082,886 | 1/1992 | Jeram et al. | 524/403 |
| 5,147,909 | 9/1992 | Odorisio et al. | 524/94 |
| 5,177,142 | 1/1993 | Stein et al. | 524/740 |
| 5,331,075 | 7/1994 | Sumpter et al. | 528/15 |
| 5,543,457 | 8/1996 | Lewis et al. | 524/736 |

FOREIGN PATENT DOCUMENTS

| | | |
|---|---|---|
| 0 531 009 A1 | 3/1993 | European Pat. Off. . |
| 1511839 | 5/1978 | United Kingdom . |
| WO93/22273 | 11/1993 | WIPO . |

OTHER PUBLICATIONS

Estimation of Volatile N–Nitrosamines In Rubber Nipples For Babies' Bottles Food Cosmet. Toxicol., vol. 20 pp. 939 to 944 (1982) D.C. Havery and T. Fazio.

N–Nitrosamines in Baby Bottle Rubber Nipples Gas Chromatographic Method AOAC Official Methods of Analysis (1990).

Reducing Nitrosamines During Vulcanization Rubber & Plastics News (Mar. 28, 1994) Dwight W. Chasar.

Gas Chromatographic–Thermal Energy Analysis Method for Determination of Volatile N–Nitrosamines in Baby Bottle Rubber Niples: Collaborative Study, by Gray & Stachiw, J. Assoc. Off. Anal. Chem. (1987) 70, Mar. Issue.

*Primary Examiner*—Melvyn I. Marquis
*Assistant Examiner*—D. Aylward
*Attorney, Agent, or Firm*—Kenneth S. Wheelock; Michelle Bugbee

[57] ABSTRACT

The present invention relates to a method for making nitrosamine-free silicone articles by treating the mixture of vinyl containing organopolysiloxane and filler with hindered phenols, a nitrosamine-free composition and a nitrosamine-free article made therefrom. A preferred nitrosamine-free molded article is a baby bottle nipple.

11 Claims, No Drawings

ADDITIVE FOR THE PREVENTION OF NITROSAMINE FORMATION IN SILICONE ARTICLES

This is a divisional of co-pending application Ser. No. 08/350,935 filed on Dec. 07, 1994.

The present invention relates to production of nitrosamine-free silicone articles. More particularly, it is concerned with production of nitrosamine-free silicone articles by the addition of additives.

BACKGROUND OF THE INVENTION

Several reports have been published describing the presence of volatile N-nitrosamines in various rubber products. The present concern about the occurrence of volatile N-nitrosamines in baby bottle rubber nipples and the possible migration of these compounds into infant formula was prompted by a report of Preussmann et al., (1981) Am. Chem. Soc. Symp. Ser. 174, American Chemical Society, Washington, D.C., p.217.

A method was described for the estimation of volatile N-nitrosamines in the rubber nipples of baby bottles. In a study of rubber nipples from one manufacturer, N-nitrosodimethylamine, N-nitrosodiethylamine and N-nitrosopiperidine were determined by gas chromatography, using a thermal energy analyzer, and their presence was confirmed by mass spectrometry with average levels of individual nitrosamines ranging from 22 to 281 ppb. When the nipples were sterilized in a conventional sterilizer together with milk or infant formula the three nitrosamines migrated into the milk or formula. Storing a bottle of milk with a rubber nipple inverted in it for 2 hr at room temperature or overnight in a refrigerator after sterilization resulted in an 8–13% average increase in the nitrosamine levels migrating into the milk. On repeated sterilization of a single nipple, the quantities of nitrosamines migrating into milk from rubber nipples declined steadily, but after seven sterilizations, nitrosamines were still readily detectable in the milk. Nitrosamine levels were higher in rubber nipples after sterilization, indicating the presence of nitrosamine precursors in the nipples. No nitrosamines were found in raw, uncured rubber. Chemical accelerators and stabilizers added during the organic rubber vulcanization process are the source of the amine precursors in rubber nipples.

On Jan. 1, 1984, the U.S. Food and Drug Administration (hereinafter "FDA") established an action level of 60 ppb total N-nitrosamines in rubber nipples. The action level was reduced to 10 ppb on Jan. 1, 1985.

A collaborative study was conducted on the FDA dichloromethane extraction method for determining volatile N-nitrosamines in baby bottle synthetic and natural organic rubber nipples. Following dichloromethane extraction, N-nitrosamines were determined by gas chromatography-thermal energy analysis. Six pairs of blind duplicate rubber nipple samples representing 6 lots were analyzed by 11 collaborating laboratories. All samples were portions taken from equilibrated composites of cut-up rubber nipples obtained from manufacturers in the United States. Recoveries of the internal standard (N-nitrosodipropylamine) at approximately 20 ppb ranged from 10 to 120%. Reproducibility relative standard deviations (RSD) were between 35 and 45% for N-nitrosamine levels from 10 to 20 ppb. However, when data from laboratories with recoveries less than 75% were excluded (this is now specified in the method), RSD, values were between 11 and 32% for N-nitrosamine levels from 6 to 26 ppb. Values were consistent with or better than those reported for other analytical techniques designed to quantitate trace contaminants at the low ppb level, e.g., aflatoxin in food. The method has been adopted as an official first action for the quantitation of volatile N-nitrosamines in baby bottle rubber nipples. See Gas Chromatographic-Thermal Energy Analysis Method for Determination of Volatile N-Nitrosamines in Baby Bottle Rubber Nipples: Collaborative Study, by Gray & Stachiw, J. Assoc. Off. Anal. Chem. (1987) 70, March Issue.

Various additives have been reported to prevent nitrosamine formation. In one case the order of addition of reagents was found to be key to prevention of nitrosamine formation in rubber and the additive erythorbic acid was employed. T. Fukuda, Y. Matsunra, S. Kusumoto, Nippon Shokuhin Kogyo Gakkaishi, 28 (1981) 606, CA 96, 85000e. Sorbic acid and sodium ascorbate were reported to be effective at preventing nitrosamine formation. See K. Tanaka, K. C. Chung, H. Hayatsu, T. Kada, Food Cosmet Toxicol., 16 (1978) 209 and R. L. S. Patterson, D. S. Mottram, Abstr. Commun. Eur. Meet Meat Res. Work., 20th An Foras Tuntais: Dublin, Ire. (1974) 77, CA 85, 19272s. Alcohols in general inhibit nitrosamine formation at pH<7 while hindered alcohols such as butylated hydroxy anisole (BHA) was reported to inhibit the formation of nitrosamine under conditions of oxidation of amines by peroxide. See T. Kurechi, K. Kikugawa, T. Kato, Food Cosmet Toxicol., 18 (1980) 591, CA 94, 191596x and N. S. Shehad, PCT Int Appl. WO 9322273, CA 120, 191111r.

Although research in the synthetic and natural organic rubber industry has been devoted to lowering or eliminating nitrosamines, none of these studies have included silicone rubber materials. Silicone elastomeric compositions, in contrast to synthetic and natural organic rubber compounds, can be prepared from a vinyl-containing polydiorganosiloxane, an organohydrogensilicone crosslinker, and a platinum catalyst The compositions of this type are desirable for many reasons. For instance, they cure without by-products. They can cure at room temperature or at elevated temperatures. They can be stabilized for storage at room temperature by utilization of a platinum catalyst inhibitor. They can be made from high and low viscosity polymers. These compositions utilize components that are low enough in viscosity that they are easily pumpable or extrudable as well as have a fast cure time. These compositions also provide cured silicone elastomers which are characterized by high strength and high durometer. Thus, these silicones became leading candidates to replace the organic rubber compounds.

Analysis of the cured silicone elastomers showed no presence of nitrosamines. However, upon post-baking as required by FDA and European BGA, the presence of nitrosamines was detected. When the cured sheet is post-baked, open (PBO) at 200° C., 3–7 ppb dimethylnitrosamine (DMNA) is detected. If the sheet is first wrapped in aluminum foil and then post baked, sealed, (PBS) the sheets had from 30–70 ppb DMNA.

For silicones to serve these FDA regulated markets, Applicants developed various techniques to prevent formation of nitrosamine during post bake. In co-pending application Ser. No. 08/298,981 filed Aug. 31, 1994, now abandoned applicants indicated that post baking in an atmosphere substantially free of oxygen can prevent formation of nitrosamine during post baking. In another co-pending application Ser. No. 08/298,728 filed Aug. 31, 1994, applicants reported that treating the polymer/filler mixture with an effective amount of acid can also prevent the formation of nitrosamine. Although these methods have been proven to be effective, not all post baking facilities are equipped with inert atmosphere capacities. The use of acid can be corrosive to some equipment Therefore, applicants continued to look for a new method.

SUMMARY OF THE INVENTION

There is provided by the present invention a nitrosamine-free cured and post-baked silicone composition comprising an effective nitrosamine formation inhibiting amount of a (E) hindered phenol admixed with a curable silicone elastomer, cured and post-baked. There is also provided an article made from such nitrosamine-free silicone composition as well as a method for making such a silicone composition.

A preferred nitrosamine-free composition when cured and post-baked comprises an effective nitrosamine formation inhibiting amount of a (E) hindered phenol admixed with a (A) vinyl-containing organopolysiloxane, a (B) silicon hydride siloxane, a (C) filler and an (D) effective catalytic amount of an addition-cure catalyst.

The method of the present invention comprises admixing component (E) with a curable silicone composition comprising Components (A), (B), (C) and (D), curing the composition comprising Components (A), (B), (C), (D) and (E), and post-baking the composition comprising Components (A), (B), (C), (D) and (E) whereby a nitrosamine-free article is obtained. In the method of this invention, the order of addition of a (E) hindered phenol to the other Components (A), (B), (C) or (D) is not critical and Component (E) may be added to any of Components (A), (B), (C) or (D) or any combination or mixture thereof. The various combinations of Components (A), (B), (C) or (D) are well known to the artisan skilled in the art of making curable silicone compositions and are not a part of the present invention. The nitrosamine-free article of the present invention is the product of the method of the present invention and comprises a composition of the present invention.

The critical feature that led to this invention is based on the discovery that the addition of hindered phenols such as butylated hydroxy toluene (BHT) prevents formation of nitrosamine upon post baking of a cured silicone article.

DETAILED DESCRIPTION OF THE INVENTION

Component (A), the vinyl-containing organopolysiloxanes, generally has a viscosity of from 5,000 to 1,000,000 centipoise at 25° C. Preferred vinyl-containing organopolysiloxanes may be vinyl-stopped polymer exemplified by the general formula $M^{Vi}D_xM^{Vi}$, a vinyl-on-chain copolymer exemplified by the formula $M^{Vi}{}_xD_yM^{Vi}$, a vinyl-stopped, vinyl-on-chain copolymer exemplified by the formula $M^{Vi}D_xD^{Vi}{}_yM^{Vi}$, vinyl and trimethylsilyl-stopped copolymers exemplified by the formula $MD_xM^{Vi}$, or mixtures thereof, wherein Vi represents a vinyl radical, M represents a trimethylsiloxy radical, $M_{Vi}$ represents dimethylvinylsiloxy, D represents dimethylsiloxy, $D^{Vi}$ represents methylvinylsiloxy and "x" and "y" are positive integers. Such polymers are taught by U.S. Pat. Nos. 5,082,886, 4,340,709, 3,884,866 issued to Jeram et al., U.S. Pat. No. 5,331,075 issued to Sumpter et al., U.S. Pat. No. 4,162,243 issued to Lee et al., U.S. Pat. No. 4,382,057 issued to Tolentino, and U.S. Pat. No. 4,427,801 issued to Sweet, hereby incorporated by reference.

Component (B), the silicon hydride siloxane polymer or silicon hydride siloxane fluid used in the invention can have about 0.04 to about 1.4% by weight of chemically combined hydrogen attached to silicon. One form of the silicon hydride siloxane is a "coupler" having the formula,

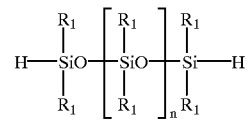

where $R^1$ is selected from $C_{1-13}$ monovalent substituted and substituted hydrocarbon radicals free of olefinic unsaturation and n is an integer having a value sufficient to provide the "coupler" with a viscosity of 1 to 500 centipoises at 25° C. and from about 3 to 9 mole percent of chain-stopping diorganohydride siloxy units, based on the total moles of chemically combined siloxy units in the silicon hydride siloxane fluid.

In addition to the above silicon hydride coupler formula, the silicon hydride siloxane fluid used in the heat curable organopolysiloxane compositions of the present invention also can include silicon hydride resins consisting essentially of the following units,

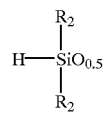

chemically combined with $SiO_2$ units, where the $R^2$+H to Si ratio can vary from 1.0 to 2.7. Silicon hydride resin also can have units of the formula,

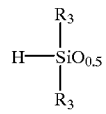

chemically combined with $SiO_2$ units and $(R^4)_2SiO$ units, where the $R^3+R^4+H$ to Si ratio can vary from 1.2 to 2.7, where $R^2$, $R^3$ and $R^4$ are each independently $C_{1-13}$ monovalent substituted and unsubstituted hydrocarbon radicals free of olefinic unsaturation.

The silicon hydride siloxane fluid also can include linear hydrogen containing polysiloxane having the formula,

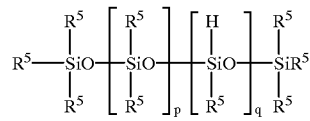

where $R^5$ is a $C_{1-13}$ monovalent substituted and unsubstituted hydrocarbon radical free of olefinic unsaturation, selected from $R^1$ radicals, and p and q are integers having values sufficient to provide a polymer having a viscosity of from 1 to 1,000 centipoises at 25° C.

In the formulas and the chemically combined units described above, $R^1$, $R^2$, $R^3$, $R^4$ and $R^5$ preferably can be the same or different radicals selected from the group consisting of alkyl radicals of 1 to 8 carbon atoms, such as methyl, ethyl, propyl, etc.; cycloalkyl radicals such as cyclohexyl, cycloheptyl, etc.; aryl radicals such as phenyl, tolyl, xylyl, etc.; and haloalkyl radicals such as 3,3,3-trifluoropropyl.

Component (C), the filler is any reinforcing or extending filler known in the prior art. In order to get the high tensile strength, for example, a reinforcing filler is incorporated. Illustrative of the many reinforcing fillers which can be employed are titanium dioxide, lithopone, zinc oxide, zirconium silicate, silica aerogel, iron oxide, diatomaceous earth, calcium carbonate, fumed silica, silazane treated silica, precipitated silica, glass fibers, magnesium oxide, chromic oxide, zirconium oxide, aluminum oxide, alpha quartz, calcined clay, asbestos, carbon, graphite, cork, cotton, synthetic fibers, etc.

Preferably, the filler is either a fumed or precipitated silica that has been treated. The treating process may be done in accordance with the teachings of U.S. Pat. No. 4,529,774 issued to Evans et al., U.S. Pat. No. 3,635,743 issued to Smith, U.S. Pat. No. 3,847,848 issued to Beers; hereby incorporated by reference, Alternatively, and most preferably, the filler is treated in-situ; that is the untreated silica filler and the treating agents are added to the silicone elastomer composition separately, and the treatment process is accomplished simultaneously with the mixture of the filler into the elastomer. This in-situ process is taught by Evans in U.S. Pat. No. 4,529,774; hereby incorporated by reference.

Alternatively, the fillers can be replaced by the vinyl treated silica filler of U.S. Pat. No. 4,162,243 issued to Lee et al.; and U.S. Pat. No. 4,427,801 issued to Sweet; hereby incorporated by reference.

Component (D), the addition-cure catalyst, is any compound that promotes the hydrosilation reaction between a silicon hydride and an ethylenically unsaturated polyorganosiloxane. Typically, it is a precious metal compound; usually platinum or rhodium, preferably platinum. Such catalysts are well known in the art. Preferred catalysts are taught by in U.S. Pat. Nos. 3,917,432, 3,197,433 and 3,220,972 issued to Lamoreaux, U.S. Pat. Nos. 3,715,334 and 3,814,730 issued to Karstedt, and U.S. Pat. No. 4,288,345 issued to Ashby et al., hereby incorporated by reference.

Since mixtures containing Components A, B, and C with a Component D catalyst, when the catalyst selected is some well known platinum or rhodium containing catalyst, may begin to cure immediately on mixing at room temperature, it may be desirable to inhibit the action of the platinum or rhodium containing catalyst at room temperature with a suitable inhibitor if the composition is to be stored before molding. Such catalyst inhibitors are used to retard the catalytic activity of the catalyst at room temperature, but allow the catalyst to catalyze the reaction between Components A, B and C at elevated temperature.

One suitable type of catalyst inhibitor is described in U.S. Pat. No. 3,445,420 issued to Kookootsedes et al. which is hereby incorporated by reference to show certain acetylenic inhibitors and their use. A preferred class of acetylenic inhibitors are the acetylenic alcohols, especially 2-methyl-3-butyn-2-ol.

A second type of catalyst inhibitor is described in U.S. Pat. No. 3,989,667 issued to Lee et al. which is hereby incorporated by reference to show certain olefinic siloxanes made by the reaction of secondary or tertiary acetylenic alcohols with siloxanes having silicon-bonded-hydrogen atoms, their preparation and their use as platinum catalyst inhibitors.

A third type of catalyst inhibitor is a polymethylvinylcyclosiloxane having three to six methylvinylsiloxane units per molecule.

The optimum concentration of catalyst inhibitor is that which will provide the desired storage stability at ambient temperature without excessively prolonging the time interval required to cure the compositions at elevated temperatures. This amount will vary widely and will depend upon the particular inhibitor that is used, the nature and concentration of the platinum-containing or rhodium-containing catalyst and the nature of the organohydrogensiloxane.

Preferred hindered phenol antioxidants employed as Component (E) include, but are not limited to 2,6-disubstituted phenols, bisphenols, polyphenols, substituted hydroquinones and substituted hindered anisoles.

Exemplary preferred 2,6-disubstituted phenols have the formula:

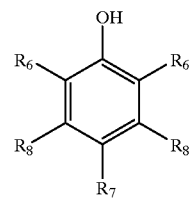

wherein $R_6$ is typically a sterically bulky group such as i-propyl, t-butyl, amyl and the like. $R_7$ and $R_8$ can be H, C1–C18 alkyl, aryl, halo such as chloro, bromo iodo, and nitro. Examples of the 2,6-disubstituted phenols include, but are not limited to 2,6-di-t-butyl-4-methylphenol (BHT), 2-t-butyl-4-methoxy phenol, 3-t-butyl-4-methoxy phenol, 4-(hydroxymethyl)2,6-di-t-butyl phenol, and styrenated phenols.

Exemplary preferred bisphenols have the formula:

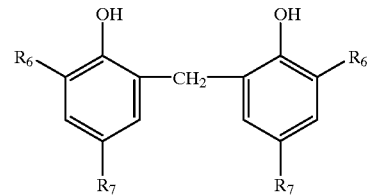

wherein $R_6$ and $R_7$ are defined the same as above. Examples of the bisphenols include but are not limited to 2,2'-methylene bis (4-methyl-6-t-butyl phenol), 2,2'-methylene bis(4-ethyl-6-t-butyl phenol), 4,4'-methylene bis (2,6-di-t-butyl phenol) and 2,2'-methylene bis(4-methyl-6-(1-methylcyclohexyl)phenol).

Examplary preferred polyphenols include, but are not limited to tetrakis (methylene 3-(3,5-di-t-butyl-4-hydroxyphenyl) propionate) methane, 1,3,5-trimethyl-2,4,6-tris(3,5-di-t-butyl-4-hydroxybenzyl) benzene, and 1,3,5-tris (3,5-di-t-butyl-4-hydroxybenzyl) isocyanurate.

Exemplary preferred substituted hydroquinones have the formula

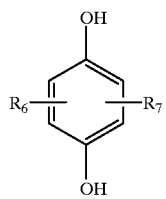

wherein $R_6$ and $R_7$ are defined the same as above. Examples of the substituted hydroquinones include, but are not limited to 2,5-di-t-amyl hydroquinone and t-butyl hydroquinone.

An example of the substituted hindered anisoles includes, but is not limited to butylated hydroxy anisole (BHA).

Compositions of the present invention can be used in a liquid injection molding process in which the composition is injected into light weight molds under low pressures, such as 600 kPa cylinder pressure. Such compositions can be cured very rapidly in a hot mold and removed without cooling the mold. The type of molding, extruding or curing process used is not critical and can include any of the processes known in the art. An advantage of the compositions of this inventions is their extrudability which makes these compositions adaptable to molding processes such as liquid injection molding at low pressures. The prepared compositions have a viscosity such that at least 45 grams per minute can be extruded through a 3.175 millimeter orifice under a pressure of 620 kilopascals. Preferably, the viscosity is such that at least 50 grams per minute can be extruded.

The silicone elastomeric compositions can readily be prepared in conventional mixing equipment because of their fluid nature. The order of mixing is not critical particularly if the addition-curable composition is to be used immediately. However, as is well-known to the skilled artisan, it is preferable to combine (A), (C) following the additive treatment and thereafter add (D) and (B). This permits the small amount of (D) to become well dispersed in (A) and (C) prior to the beginning of any curing reaction. A suitable two package addition-curable composition can be made using such a well-known technique. For example, a convenient two package composition can be prepared by mixing part of (A), part of (C) and all of (D) in one package and the remainder of (A) and (C) and all of (B) in a second package such that equal amounts of package one and package two can be mixed to produce the compositions of this invention. Single package compositions can be prepared by mixing (A),(B), (C), (D), and a platinum catalyst inhibitor. These inhibited compositions can be stored for extended periods of time without curing, but the compositions will still cure when heated above 70° C., preferably when heated above 100° C. to shorten the cure time. As noted above, the hindered phenol can be added at any stage and to any component or any mixture of Components (A)–(D).

In order to demonstrate various features of this invention, the following examples are submitted. They are for illustrative purposes and are not intended to limit in any way the scope of this invention.

EXAMPLE 1
Test Specimen Preparation

A silicone LIM base compound was prepared according to the teachings of this invention using the formulation of Table I.

TABLE I

| Parts | Inputs |
| --- | --- |
| 64.5 pts | 40,000 cps vinyl chainstopped polydimethylsiloxane polymer |
| 25 pts | 325 m²/gm octamethylcyclotetrasiloxane treated fumed silica |
| 1 pt | vinyltriethoxysiloxane |
| 6 pts | hexamethyldisilazane |
| 6 pts | water |
| 4 pts | 500 cps vinyl chainstopped, polydimethyl, methylvinyl copolymer |
| 4 pts | 500 cps trimethylsilyl and dimethylvinyl chainstopped polydimethylsiloxane polymer |
| 2.5 pts | MQ resin |

The 40,000 cps vinyl chainstopped polymer, water and hexamethyldisilazane were mixed together in a cooled mixer. The 325 m²/gm $D_4$ treated filler was added slowly into the mixture and mixed until it was completely incorporated. The vinyltriethoxysilane was added into the mixture and mixed well. The mixer was sealed and heated for one hour at 70–80° C. The batch was stripped at 140° C. under full vacuum to remove all the filler treating reaction by products. BHT was then added (see Table 2) and then the mixture was cooled to 80° C. and added the two 500 cps vinyl containing copolymers and mixed well. 2.5 parts of the MQ resin release agent was added. Vacuum was then applied to deair the batch.

Component A was prepared by adding sufficient amount of Karstedt platinum organosiloxane complex to obtain 20–40 ppm Pt as platinum. Component B was prepared by adding approximately 330 ppm H of hydride crosslinker ($M^H D_x D_y^H M^H$) and approximately 0.4 parts methyl butynol, mixed until well dispersed. A LIM composition was prepared by mixing 100 parts of Component A with 100 parts of Component B in a static mixer with no air being introduced. The A/B mixture was then molded 20 seconds at 375° F. into 3"×5"×0.070" sheets. The as molded sheet has less than 1.0 ppb DMNA.

EXAMPLE 2

A sheet prepared according to Example 1 was post baked for one hour @200° C, in an air circulating oven and cooled to room temperature. The sample was referred to as PBO. A second sheet was wrapped in aluminum foil and post baked under the same conditions. The sample was referred to as PBS. The results are shown below:

TABLE 2

| | Nitrosamine (ppb) | |
| --- | --- | --- |
| Amount of BHT (g)* | PBO | PBS |
| 0 (control) | 4.0 | 42.8 |
| 1 | <1 | <1 |
| 0.5 | <1, Recheck 2.0 | <1, Recheck 1.7 |
| 0.25 | 8.8 | 1.0 |
| 0.1 | 12.1 | 1.4 |

*Based on a 200 g batch size. All samples were post baked 1 h, 200° C., in air, PBS samples were wrapped in aluminum foil.

*Based on a 200 g batch size. All samples were post baked 1 h, 200° C., in air, PBS samples were wrapped in aluminum foil.

The results clearly demonstrate that the treatment with 0.1–0.25 g BHT substantially reduced the formation of nitrosamine. 0.5–1 g BHT totally eliminated the formation of nitrosamine.

What is claimed is:

1. A nitrosamine-free composition comprising an effective nitrosamine formation inhibiting amount of a hindered phenol and a curable silicone elastomer which has been admixed together, cured and post-baked, said silicone elastomer comprising:

(A) a vinyl-containing organopolysiloxane;

(B) a silicon hydride siloxane;

(C) a filler, and (D) an effective catalytic amount of an addition-cure catalyst.

2. The composition of claim 1 wherein the filler is a reinforcing filler.

3. The composition of claim 2 wherein the filler is fumed silica.

4. The composition of claim 1 wherein the catalyst is a platinum or rhodium compound.

5. The composition of claim 4 wherein the catalyst is a platinum compound.

6. The composition of claim 1, wherein the hindered phenol is selected from the group consisting of a 2,6- disubstituted phenol, bisphenol, polyphenol, a substituted hydroquinone and a substituted hindered anisole.

7. The composition of claim 6, wherein the 2,6-disubstituted phenol is 2,6-di-t-butyl-4-methylphenol, 2-t-butyl(4-methoxy phenol, 3-t-butyl-4-methoxy phenol, 4-(hydroxymethyl)-2,6-di-t-butyl phenol or styrenated phenol.

8. The composition of claim 6, wherein the bisphenol is 2,2'-methylene bis(4-methyl-6-t-butyl phenol), 2,2'-methylene bis(4-ethyl-6-t-butyl phenol), 4,4'-methylene bis (2,6-di-t-butyl phenol) or 2,2'-methylene bis (4-methyl-6-(1-methylcyclohexyl)phenol).

9. The composition of claim 6 wherein the polyphenol is tetrakis (methylene 3-(3,5-di-t-butyl-4-hydroxyphenoyl) propionate)methane, 1,3,5-trimethyl-2,4,6-tri(3,5-di-t-butyl-4-hydroxybenyl) benzene, or 1,3,5-tris(3,5-di-t-butyl-4-hydroxybenzyl)isocyanurate.

10. The composition of claim 6 wherein the hindered anisole is bulylated hydroxy anisole.

11. The composition of claim 1 which is substantially transparent.

* * * * *